(12) United States Patent  
Klassen et al.

(10) Patent No.: US 7,849,313 B2  
(45) Date of Patent: *Dec. 7, 2010

(54) SECURE PEER-TO-PEER MESSAGING INVITATION ARCHITECTURE

(75) Inventors: Gerhard Dietrich Klassen, Waterloo (CA); Samer Fahmy, Waterloo (CA); David Yach, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/342,291

(22) Filed: Dec. 23, 2008

(65) Prior Publication Data

US 2009/0164784 A1 Jun. 25, 2009

Related U.S. Application Data

(63) Continuation of application No. 10/975,442, filed on Oct. 29, 2004, now Pat. No. 7,489,781.

(51) Int. Cl.  
*H04L 9/32* (2006.01)

(52) U.S. Cl. ..................................... 713/168

(58) Field of Classification Search ...................... 726/2, 726/5; 713/168, 184; 380/270, 273  
See application file for complete search history.

(56) References Cited

U.S. PATENT DOCUMENTS

| | | | |
|---|---|---|---|
| 5,745,578 A | 4/1998 | Hassan et al. | |
| 5,920,822 A | 7/1999 | Houde et al. | |
| 6,031,913 A | 2/2000 | Hassan et al. | |
| 6,886,095 B1 | 4/2005 | Hind et al. | |
| 7,131,003 B2 | 10/2006 | Lord et al. | |
| 7,159,178 B2 * | 1/2007 | Vogt et al. | ................... 715/733 |
| 7,321,969 B2 | 1/2008 | Schoen et al. | |

FOREIGN PATENT DOCUMENTS

| | | |
|---|---|---|
| EP | 1233570 A1 | 8/2002 |
| EP | 1310115 A1 | 4/2006 |
| WO | 9807260 A1 | 2/1998 |
| WO | 0217659 A1 | 2/2002 |
| WO | 2005027429 A1 | 3/2005 |

OTHER PUBLICATIONS

Matossian et al, Enabling Peer-to-Peer Interactions for Scientific Applications on the Grid, 2003, Rutgers University, Piscataway NJ 08855, USA, http:/springerlink.com/content/mv24r3djb1pvuxm.

* cited by examiner

*Primary Examiner*—Ellen Tran  
(74) *Attorney, Agent, or Firm*—Jones Day; Krishna K. Pathiyal; Robert C. Liang

(57) ABSTRACT

A system and methods providing immediate peer-to-peer messaging between mobile devices in a wireless system. An invitation architecture is disclosed which enables the exchange of personal identification numbers (PINs) without requiring a user to directly access or provide his or her PIN. A messaging application encrypts its associated PIN before providing it to a messaging application on another mobile device through an existing communication application. An invitation process for exchanging encrypted PINs involves receiving an invitation containing a question, obtaining user input of an answer, and transmitting the answer back to the sender with an encrypted PIN. The sender confirms the received answer is correct and replies with its encrypted PIN.

11 Claims, 5 Drawing Sheets

| Messaging Status | 7:00 PM | |
|---|---|---|
| Current Conversations | Status | Last |
| ✓ Michael Adams | Available | S: 8/9/04, 6:50P |
| ( Mary Jones | On the Phone | S: 8/15/04, 11:20A |
| 👤 John Smith | In a Meeting | R: 8/12/04, 5:42P |
| Blocked Correspondents | | |
| Dad | | |
| Mr. Jones | | |
| Pending Conversations | Status | |
| 🚫 Fred Johnson | Unavailable | |
| 📠 Mrs. Zimmer | Currently Messaging | |

SECURE PEER-TO-PEER MESSAGING INVITATION ARCHITECTURE

CROSS-REFERENCE TO RELATED APPLICATIONS

The present application is a continuation of U.S. patent application Ser. No. 10/975,442, filed Oct. 29, 2004.

FIELD OF TECHNOLOGY

The present application relates generally to a secure messaging invitation architecture for mobile devices such as cell phones, smart phones, personal data assistants (PDAs), pagers, handheld computers, phone-enabled laptop computers, and other mobile electronic devices, and more particularly, to a peer-to-peer immediate messaging solution for mobile devices.

BACKGROUND INFORMATION

Instant messaging (IM) is a service that alerts users when another individual, such as a friend or colleague, is online and allows them to send messages to each other in real time, without the store-and-forward delays inherent in an electronic mail solution. With instant messaging, each user creates a list of other users with whom he or she wishes to communicate (commonly referred to as "buddy lists"). An instant messaging server keeps track of the online status of each of its subscribed users (often referred to as presence information), and when someone from a user's buddy list is online, the service alerts that user and enables immediate contact with the other user.

IM solutions are multiplying quickly and are showing up not only in land-line environments but also in wireless environments used by mobile devices such as cell phones, smart phones, personal data assistants (PDAs), pagers, phone-enabled laptop computers, and other mobile electronic devices. Wireless environments offer the potential for strong IM solutions, based on the time a user carries their mobile device with them. The number of available mobile devices that can run IM solutions is in the hundreds of millions.

It is well known in the art to port IM clients to a mobile device in order to gain access to one of the many IM services available. These services include AOL's Instant Messenger (AIM), ICQ, Yahoo! and Microsoft's MSN Messenger products. These products are known to have tens of millions of users supported by each IM server, and these communities are sometimes inter-connected to produce even larger communities. However, land-line and desktop-based IM solutions falls short of what a user that is often mobile wants and needs, namely good IM functionality wherever they may be with their mobile device. Additionally, the small screens and memories of mobile devices often result in a frustrating experience for people on the road trying to use IM. These people are forced to accept the poor performance and experience of existing IM solutions because they want or need to reach land-line users operating legacy desktop IM solutions and have no other alternatives to select from. There is thus a need for a better and more complete messaging solution (that enables immediate messaging like IM) that is designed for wireless mobile electronic devices that can take advantage of the "always on" nature of a mobile device.

Another problem with existing IM applications is the lack of security. With existing IM applications, it is easy to share the identity of users, meaning that one's identity may be widely disseminated without permission and one might therefore receive messages from an unknown or unwanted source. This leads to a proliferation of junk messages, spam, viruses, and other security concerns. It is also difficult to verify or authenticate the source of an invitation to initiate messaging, which may give rise to impersonation and related security issues.

Another common wireless messaging standard is short message service (SMS), used throughout North America and especially in European China and India. This service also has many flaws. First, the addressing of each SMS user must be performed through their MS-ISDN, or telephone number. This phone number is extremely easy to pass around and it is impossible to verify the authenticity of the sender. Second, there is no implied presence, or any actual delivery information, so the exchange of information has a lot of risk associated with it. SMS also has no concept of a conversation that lasts forever, and in fact there are no SMS devices that keep long-term status information regarding an SMS conversation with another party.

BRIEF DESCRIPTION OF THE DRAWINGS

Embodiments will now be described, by way of example only, with reference to the attached Figures, wherein:

FIG. 3 is a view of a portion of a display of a mobile device showing an exemplary status screen forming a part of a peer-to-peer messaging application;

Like reference numerals are used throughout the Figures to denote similar elements and features.

DETAILED DESCRIPTION

Figure 1:
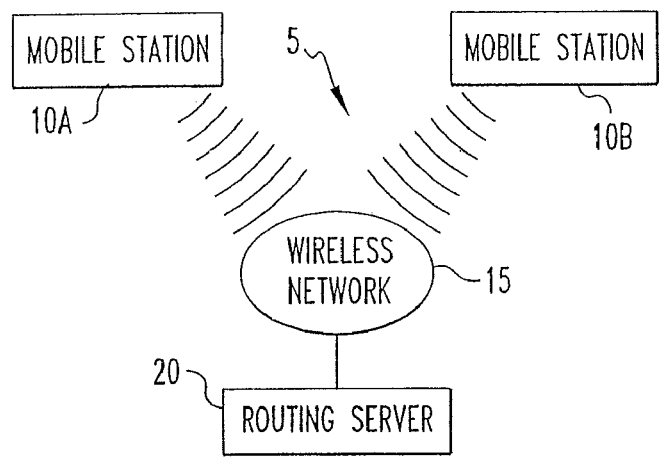
FIG. 1 is a block diagram of a system providing immediate peer-to-peer messaging between mobile devices.

The present application describes a system and a method that provide for immediate peer-to-peer messaging between mobile devices. The system and method provide increased security by maintaining the secrecy of the underlying address identity of each user of a mobile device in the system. An invitation architecture is disclosed which enables the exchange of personal identification numbers (PINs) without requiring a user to directly access or provide his or her PIN. A messaging application encrypts its associated PIN before providing it to a messaging application on another mobile device through an existing communication application. The invitation architecture automatically manages the encryption, any requisite key exchanges, the composition of invitation and acceptance messages, and the decryption and storage of PINs.

In one aspect, the present application provides a method of securely exchanging personal identification numbers between a first mobile device and a second mobile device. The mobile devices are used in a system including a wireless network and a routing server coupled to the wireless network. Each mobile device has one or more communications applications and each mobile device further has a messaging application. The first mobile device has a first personal identification number and the second mobile device has a second personal identification number. The method includes the steps of encrypting the first personal identification number, sending the encrypted first personal identification number from the first mobile device to the second mobile device using one of the communication applications, and decrypting the encrypted first personal identification number and storing the first personal identification number in a memory on the second mobile device. The method also includes the steps of encrypting the second personal identification number, sending the encrypted second personal identification number from the second mobile device to the first mobile device using one of the communication applications, and decrypting the encrypted second personal identification number and storing the second personal identification number in a memory on the first mobile device. After this exchange of PINs, peer-to-peer messages are exchanged between the first mobile device and the second mobile device using the messaging applications. Each peer-to-peer message contains one of the personal identification numbers and each peer-to-peer message is routed by the routing server based upon the personal identification numbers.

In another aspect, the present application provides a peer-to-peer messaging system. The system includes a plurality of mobile devices, a wireless network, and a routing server coupled to the wireless network. Each mobile device has one or more communication applications and each mobile device includes a memory storing a first personal identification number. Each mobile device also includes a messaging application wherein the messaging application includes an encryption component, a decryption component, a contact management component, and a messaging component. The encryption component is for encrypting the first personal identification number and for embedding the encrypted first personal identification number into a communication for transmission to another mobile device using one of the communication applications. The decryption component is for receiving an incoming communication from the another mobile device via the one of the communication applications, wherein the incoming communication includes an encrypted second personal identification number, and for extracting and decrypting the encrypted second personal identification number. The contact management component is for automatically managing the exchange of invitations and acceptances with the another mobile device using the one of the communication applications. The messaging component is for sending and receiving peer-to-peer messages, whereby the peer-to-peer messages each include one of the personal identification numbers, and wherein the peer-to-peer messages are routed by the routing server based upon the personal identification numbers.

In yet another aspect, the present application provides a mobile device for engaging in peer-to-peer messaging with other mobile devices over a wireless network. The wireless network includes a routing server. The mobile device includes a communications subsystem for engaging in wireless communication with the wireless network, memory for storing a first personal identification number, and a processor connected to the memory and to the communications subsystem for controlling operation of the communications subsystem. The mobile device also includes a communication application for composing and sending communications to the other mobile devices and a messaging application. The messaging application includes an encryption component, a decryption component, a contact management component, and a messaging component. The encryption component is for encrypting the first personal identification number and for embedding the encrypted first personal identification number into a communication for transmission to another mobile device using one of the communication applications. The decryption component is for receiving an incoming communication from the another mobile device via the one of the communication applications, wherein the incoming communication includes an encrypted second personal identification number, and for extracting and decrypting the encrypted second personal identification number. The contact management component is for automatically managing the exchange of invitations and acceptances with the another mobile device using the one of the communication applications. The messaging component is for sending and receiving peer-to-peer messages, whereby the peer-to-peer messages each include one of the personal identification numbers, and wherein the peer-to-peer messages are routed by the routing server based upon the personal identification numbers.

In a further aspect, the present application discloses a method implemented by a mobile device in a system comprising the mobile device, a wireless network and a routing server coupled to the wireless network, the mobile device having a user interface and a plurality of communications applications and further having a messaging application, the mobile device having a first personal identification number. The method includes receiving an invitation via one of the communications applications, the invitation including a question; displaying the question; receiving through the user interface an answer in response to the question; encrypting the first personal identification number; transmitting the answer and the encrypted first personal identification number in response to the received invitation; receiving an encrypted second personal identification number in response to the transmitted first personal identification number; and decrypting the encrypted second personal identification number. The peer-to-peer messages are sent and received by the mobile device using said messaging application, and each transmitted peer-to-peer message contains the second personal identification number, each received peer-to-peer message contains the first personal identification number, and each peer-to-peer message is routed by the routing server based upon said personal identification numbers.

In yet a further aspect, the present application discloses a method implemented by a mobile device in a system comprising said mobile device, a wireless network and a routing server coupled to the wireless network, the mobile device having one or more communications applications and further having a messaging application, the mobile device having a first personal identification number. The method includes sending an invitation via one of the communications applications, the invitation including a question, the question having a stored answer; encrypting the first personal identification number; receiving a user-submitted answer and an encrypted second personal identification number in response to the invitation; confirming that the user-submitted answer matches the stored answer; decrypting the second encrypted personal identification number; and transmitting the encrypted first personal identification number in response to receipt of the encrypted second personal identification number. The whereby peer-to-peer messages are sent and received by the mobile device using said messaging application, and each transmitted peer-to-peer message contains the second personal identification number, each received peer-to-peer message contains the first personal identification number, and each peer-to-peer message is routed by the routing server based upon said personal identification numbers.

In another aspect, the present application discloses a mobile device for use in a peer-to-peer messaging system comprising said mobile device, a wireless network, and a routing server coupled to the wireless network. The mobile device includes a first memory storing a first personal identification number; one or more communication applications; a first encryption component configured to encrypt said first personal identification number and decrypt an encrypted second personal identification number using an encryption key; a first contact management component configured to receive an invitation via one of said one or more communication applications, the invitation including a question, display the invitation including the question, receive an answer via a user interface in response to the question, transmit the answer and the encrypted first personal identification number in response to the invitation, and receive the encrypted second personal identification number in response to transmission of the encrypted first personal identification number; and a first messaging application for sending and receiving peer-to-peer messages. Each transmitted peer-to-peer message includes the second personal identification number, each received peer-to-peer message includes the first personal identification number, and said peer-to-peer messages are routed by the routing server based upon said personal identification numbers.

In yet a further aspect, the present application discloses a peer-to-peer messaging system, comprising the mobile device described above and another mobile device. The another mobile device includes a second memory storing the second personal identification number, one or more communication applications, a second encryption component configured to encrypt said second personal identification number and decrypt the encrypted first personal identification number using the encryption key, a second contact management component configured to send the invitation to the mobile device using said one of said communication applications, receive an acceptance from said mobile device containing said answer, receive the encrypted first personal identification number from the mobile device, confirm that the received answer matches a stored answer, and transmit the encrypted second personal identification number to the mobile device, and a second messaging application for sending and receiving peer-to-peer messages.

Other aspects and features of the present application will be apparent to one of ordinary skill in the art in light of the following detailed description and drawings depicting one or more embodiments.

Referring now to the drawings, FIG. 1 is a block diagram of a system 5 for enabling immediate peer-to-peer messaging. System 5 includes a plurality of mobile stations 10, such as mobile devices 10A and 10B shown in FIG. 1, which may be any type of wireless mobile electronic communications device such as a cell phone, a smart phone, a personal data assistant (PDA), a pager, a handheld computer or a phone-enabled laptop computer, to name a few. As is known, each mobile device 10 may be provided with various applications, including, without limitation, one or more currently existing applications that enable communication with other mobile devices 10, such as a wireless telephone application, an email application, a short message service (SMS) application, a multimedia messaging service (MMS) application, an enhanced message service (EMS) application, and other Internet enable messaging applications (each of which may be referred to herein as an "existing communications application"). In addition, each mobile device 10 is provided with an application that implements the peer-to-peer messaging solution described herein (referred to herein as the "messaging application"). The term "application" as used herein shall include one or more programs, routines, subroutines, function calls or other type of software or firmware and the like, alone or in combination. System 5 also includes wireless network 15, which may be any wireless communications network or combination of interconnected networks, including, without limitation, Mobiltex™, DataTAC™, AMPS, TDMA, CDMA, GSM/GPRS, PCS, EDGE, UMTS or CDPD. As is known, wireless network 15 includes a plurality of base stations that perform radio frequency (RF) protocols to support data and voice exchanges with mobile devices 10A and 10B. Routing server 20 is coupled to wireless network 15. Routing server 20 may be any type of routing equipment capable of routing data packets, including, without limitation, a TCP/IP router such as those sold by Cisco Systems, Inc. of San Jose, Calif., or a network address translation server (NAT).

Each mobile device 10 of system 5 is assigned and stores a unique personal identification number (PIN). The PIN for each mobile device 10 may be assigned and stored therein when it is manufactured or through its subscriber identity module (SIM). Each PIN is mapped to a network address for the corresponding mobile device 10 on wireless network 15 that enables data to be routed to the mobile device 10. Routing server 20 includes one or more routing tables for routing messages sent by mobile devices 10 based on this mapping. In one exemplary embodiment, the PIN may actually be the network address itself, and in another exemplary embodiment, the PIN may be the phone number of the mobile device 10 or a unique ID such as the mobile subscriber ISDN (MSISDN) for the mobile device 10, and the network address may be an IP address or the like. It will be understood that the term "personal identification number" or "PIN" used herein is not intended to be limited solely to numeric identifiers, but is to be understood broadly and may include alphanumeric identifiers, binary identifiers, or other identifiers that can be used to enable peer-to-peer messaging.

For convenience in describing the establishment and maintenance of a peer-to-peer messaging session between two mobile devices 10, reference will be made to mobile device 10A and 10B shown in FIG. 1. It will be appreciated, however, that the same description will apply to a peer-to-peer messaging session between any two mobile devices 10. When a user of mobile device 10A wants to establish a peer-to-peer messaging session with another mobile device 10, such as mobile device 10B, mobile device 10A creates and sends an invitation to mobile device 10B using one or more of the existing communications applications common to both mobile device 10A and mobile device 10B. Preferably, this is facilitated and accomplished through the peer-to-peer messaging application using appropriate menus and/or dialog boxes displayed to the user on a display of mobile device 10A. For example, in one embodiment, the user initiates an invitation through selecting an invitation option in a dialog box or menu associated with the messaging application. The user may be prompted to provide address information for routing the invitation using the existing communication application. For example, the user may provide an email address associated with mobile device 10B. The messaging application then causes an e-mail to be composed and sent to mobile device 10B using an e-mail application.

The invitation in each case consists of a message appropriate for the particular existing communications application, such as an email, SMS, EMS, or MMS message or a wireless telephone call, that includes some form of a request as to whether the user of mobile device 10B wants to accept the invitation and establish a peer-to-peer messaging session with mobile device 10A using mobile device 10B and an indicator(s) that identifies the message as an invitation to engage in peer-to-peer messaging. The indicator(s) may include an attachment, embedded text, or other data elements that enable the messaging application on mobile device 10B to recognize the message as an invitation. The messaging application is configured to monitor the "inbox" or watch for receipt of messages in connection with one or more of the existing communication applications. In particular, the messaging application monitors incoming messages to determine if they contain the indicator(s) that would signify that the message is a peer-to-peer messaging invitation.

Upon receipt of such an invitation, the messaging application on mobile device 10B invokes an acceptance process or routine. In particular, the messaging application notifies the user of mobile device 10B that an invitation has been received and solicits input from the user as to whether or not the invitation should be accepted. The notification may include information identifying the user of mobile device 10A, such as an e-mail address or other such information as may be obtained from the invitation. In one embodiment, the notification may be presented to the user of mobile device 10B by the messaging application in the form of a dialog box, menu, pop-up window or other graphical user interface (GUI). The notification window or interface may, in one embodiment, include selectable buttons or other graphical input features to allow the user of the mobile device 10B to indicate whether or not the invitation is accepted.

If the user of mobile device 10B indicates that he or she accepts the invitation and therefore wishes to establish a peer-to-peer messaging session, for example by selecting an "accept" button on the GUI, then the messaging application on mobile device 10B causes an acceptance communication to be transmitted to the originating mobile device 10A by way of the appropriate existing communication application. For example, in one embodiment the messaging application causes an acceptance e-mail to be composed and sent using the e-mail application. The messaging application on mobile device 10A is configured to recognize receipt of an acceptance message, like an acceptance e-mail.

In addition to, or in conjunction with, exchanging an invitation and acceptance using the existing communication applications, the mobile devices 10A and 10B exchange PINs. In one embodiment, the PIN for mobile device 10B is sent with the acceptance message. In one embodiment, the PIN for mobile device 10A may be sent with either the invitation message or with a subsequent acknowledgement message after receipt of the acceptance message.

In accordance with the present application, the secrecy and confidentiality of the PINs is maintained despite the need to exchange them between mobile devices. If a user's PIN is made generally available to another user by sending it over an unsecured channel, then it is easy for the other user to share the PIN with a wide range of users or it is easy for an unauthorized recipient to intercept a message and obtain the PIN. Most of the existing communication applications, like e-mail, utilize unsecured channels. As a result a mobile device may receive messages from unwanted sources that have obtained the PIN for the mobile device. Accordingly, the PINs are exchanged in an encrypted form in embodiments disclosed in the present application.

The encrypted PINs may be embedded directly within the messages sent using the existing communication applications or may be attached to the messages. For example, with an e-mail application the encrypted PIN may be attached as a binary file. It will be appreciated that e-mail having a binary file attached may encounter problems in traversing firewalls and spam filters. Accordingly, in another embodiment, the encrypted PIN is embedded directly within the body of the e-mail. In this embodiment, a reader of the e-mail will see the encrypted PIN as a series of incomprehensible text symbols, however the messaging application is configured to extract and decrypt the encrypted PIN. Additional details regarding the exchange of encrypted PINs and related key management and key exchange operations are provided below.

As will be appreciated, once the above steps are complete, mobile device 10A will have the PIN for mobile device 10B, and mobile device 10B will have the PIN for mobile device 10A. Now, if either mobile device 10A or 10B desires to send a peer-to-peer message to the other, it prepares a peer-to-peer message using the peer-to-peer messaging application that includes the PIN of the recipient mobile device 10 (10A or 10B, as the case may be), preferably in the message header, along with the message information that is to be sent. The peer-to-peer message is then sent by the mobile device 10 through wireless network 15 to routing server 20. Routing server 20 obtains the PIN from the peer-to-peer message and uses it to determine the network address of the recipient mobile device 10 (10A or 10B, as the case may be) using the routing table(s) stored therein, and sends the message to the recipient mobile device 10 (10A or 10B, as the case may be) through wireless network 15 using the determined network address. Once received, the peer-to-peer message, and in particular the message information contained therein, may be displayed to the user of the recipient mobile device 10 (10A or 10B, as the case may be).

Figure 5:
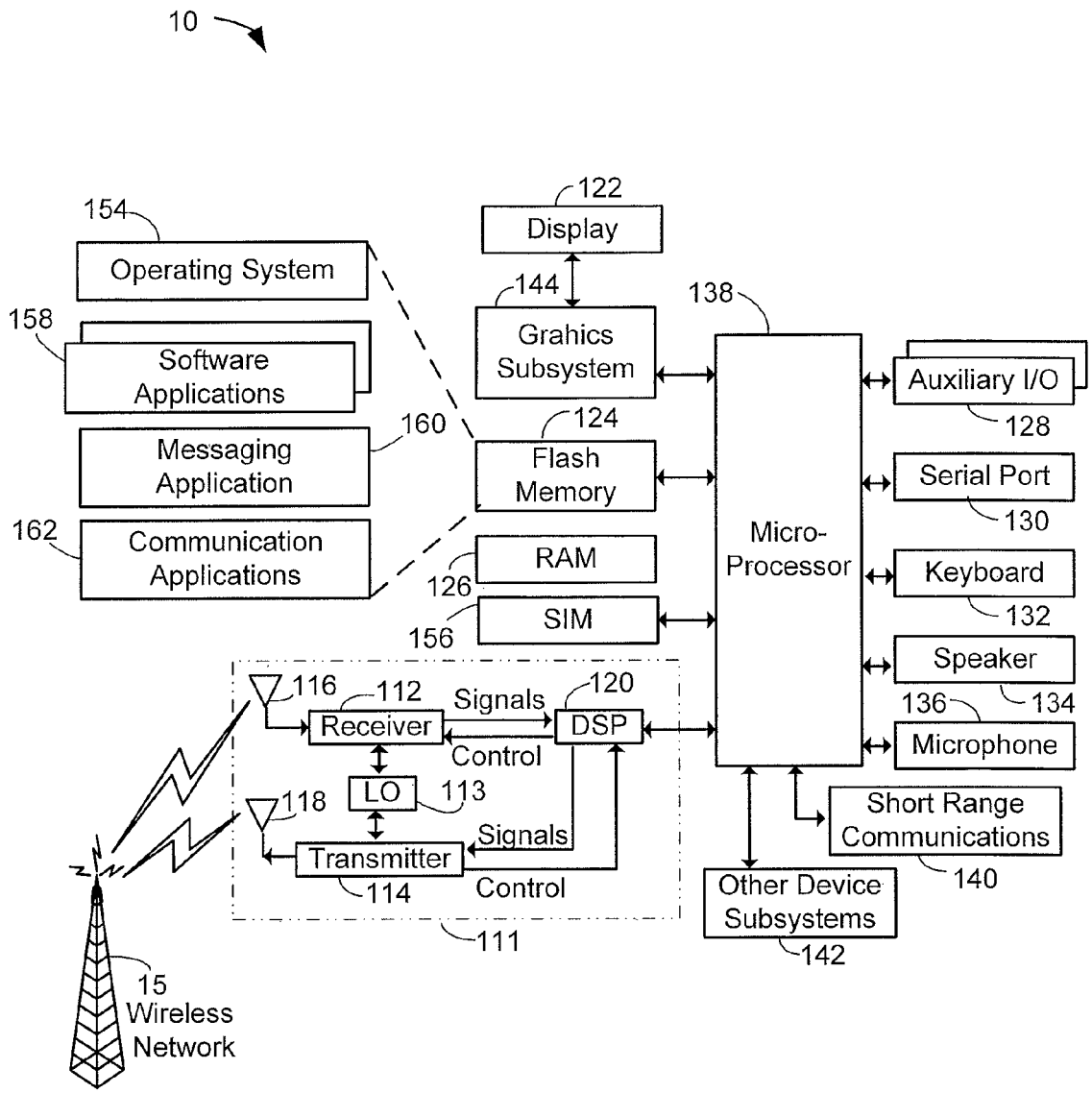
FIG. 5 shows, in block diagram form, a mobile device configured to provide peer-to-peer messaging.

Reference is now made to FIG. 5, which shows a block diagram of an example embodiment of a mobile device 10. In the example embodiment, the mobile device 10 is a two-way mobile communication device 10 having data and possibly also voice communication capabilities. In an example embodiment, the device 10 has the capability to communicate with other computer systems on the Internet. Depending on the functionality provided by the device 10, in various embodiments the device may be a data communication device, a multiple-mode communication device configured for both data and voice communication, a mobile telephone, a PDA enabled for wireless communication, or a computer system with a wireless modem, among other things.

The device 10 includes a communication subsystem 111, including a receiver 112, a transmitter 114, and associated components such as one or more, preferably embedded or internal, antenna elements 116 and 118, and a processing module such as a digital signal processor (DSP) 120. In some embodiments, the communication subsystem includes local oscillator(s) (LO) 113, and in some embodiments the communication subsystem 111 and a microprocessor 138 share an oscillator. As will be apparent to those skilled in the field of communications, the particular design of the communication subsystem 111 will be dependent upon the communication network in which the device 10 is intended to operate.

Signals received by the antenna 116 through the wireless network 15 are input to the receiver 112, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 120 and input to the transmitter 114 for digital to analog conversion, frequency up conversion, filtering, amplification and transmission over the wireless network 15 via the antenna 118.

The device 10 includes the microprocessor 138 that controls the overall operation of the device. The microprocessor 138 interacts with the communications subsystem 111 and also interacts with further device subsystems such as the graphics subsystem 144, flash memory 124, random access memory (RAM) 126, a subscriber identity module (SIM) 156, auxiliary input/output (I/O) subsystems 128, serial port 130, keyboard or keypad 132, speaker 134, microphone 136, a short-range communications subsystem 140, and any other device subsystems generally designated as 142. The graphics subsystem 144 interacts with the display 122 and renders graphics or text upon the display 122.

Operating system software 154 and various software applications 158 used by the microprocessor 138 are, in one example embodiment, stored in a persistent store such as flash memory 124 or similar storage element. Those skilled in the art will appreciate that the operating system 154, software applications 158, or parts thereof, may be temporarily loaded into a volatile store such as RAM 126. It is contemplated that received communication signals may also be stored to RAM 126.

The microprocessor 138, in addition to its operating system functions, preferably enables execution of software applications 158 on the device. A predetermined set of communication applications 162 may be installed on the device 10 during manufacture. The communication applications 162 may include data communication applications and/or voice communication applications. A typical data communication application may include an electronic messaging module for allowing a user to receive, read, compose, and send text-based messages. For example, the electronic messaging module may include an e-mail application, a SMS application, an MMS application, and/or an EMS application. Further software applications 158 and/or communication applications 162 may also be loaded onto the device 10 through the network 15, the auxiliary I/O subsystem 128, serial port 130, short-range communications subsystem 140 or any other suitable subsystem 142, and installed by a user in the RAM 126 or a non-volatile store for execution by the microprocessor 138. Such flexibility in application installation increases the functionality of the device 10 and may provide enhanced on-device functions, communication-related functions, or both.

In a data communication mode, a received signal such as a text message or web page download will be processed by the communication subsystem 111 and input to the microprocessor 138, which will preferably further process the received signal for output to the display 122 through the graphics subsystem 144, or alternatively to an auxiliary I/O device 128. A user of device 10 may also compose data items within a software application 158 or a communication application 162, such as email messages for example, using the keyboard 132 in conjunction with the display 122 and possibly an auxiliary I/O device 128. Such composed items may then be transmitted over a communication network through the communication subsystem 111.

The serial port 130 shown in FIG. 5 would normally be implemented in a personal digital assistant (PDA)-type communication device for which synchronization with a user's desktop computer (not shown) may be desirable, but is an optional device component. Such a port 130 would enable a user to set preferences through an external device or software application and would extend the capabilities of the device by providing for information or software downloads to the device 10 other than through a wireless communication network.

The short-range communications subsystem 140 is a further component which may provide for communication between the device 10 and different systems or devices, which need not necessarily be similar devices. For example, the subsystem 140 may include an infrared device and associated circuits and components or a Bluetooth™ communication module to provide for communication with similarly enabled systems and devices. The device 10 may be a handheld device.

The device 10 further includes a messaging application 160. The messaging application 160 includes a monitoring component, an invitation component and an acceptance component, which may collectively be referred to as a contact management component. The role of the contact management component is to establish contact or "buddy" relationships, i.e. to update and maintain the contact information, based on the sending out of or the receiving of invitations and acceptances with new contacts. The messaging application 160 further includes a messaging component for performing peer-to-peer messaging using the contact information.

The PIN associated with the mobile device 10 is stored in memory. It may, for example, be stored in the SIM 156, in RAM 126, in firmware or otherwise. Also stored in memory on the device 10 is contact information for use in association with the messaging application 160. The contact information contains contact names and associated PINs.

The invitation component of the messaging application 160 composes and sends invitations to prospective contacts. A user of the device 10 instructs the messaging application 160 to send an invitation to another device. The user may provide an address for reaching the other device, such as an e-mail address. The invitation component generates and sends an invitation message through one of the communication applications 162, such as the e-mail application.

The monitoring component of the messaging application 160 watches for receipt of invitation messages from other mobile devices 10. For example, the monitoring component may monitor the inbox of the email application to assess whether any received messages are messaging invitations. A messaging invitation may include predefined text, a code, or some other data element to signify that it is a messaging invitation. If the monitoring component identifies an invitation, then it may notify the user and prompt the user to accept or reject the invitation. For example, the monitoring component may display a dialog box or pop-up window showing information regarding the sender of the invitation and offering selections to the user, such as "accept" and "reject" buttons. If the user indicates acceptance of the invitation, then the acceptance component is triggered.

The acceptance component automatically generates and sends an acceptance message through one of the communication applications 162, such as the e-mail application.

The messaging application 160 includes components for performing encryption, decryption, and related key management functions for exchanging PINs. These components may be provided as a part of the invitation and acceptance components or as separate components interacting therewith. These components manage the encryption of a resident PIN, the generation or calculation of any required key values or session keys, the attachment or embedding of encrypted PINs into messages for transmission through one of the existing communication applications 162, and the decryption of encrypted PINs received from other mobile devices 10 through one of the communication applications 162. Further detail regarding encryption, decryption, and key exchange within the context of the invitation architecture is given below.

Reference is again made to FIG. 1. In one embodiment, security may be increased in peer-to-peer messaging by sending invitations as described above over multiple communication paths using multiple existing communications applications. As will be appreciated, each communication path confirms a different address identity for the sender of the invitation, thus helping to confirm the authenticity of the invitation. For example, the user of mobile device 10A may wish to establish a peer-to-peer messaging session with the user of mobile device 10B by sending an invitation as described above using both an email application and an SMS application. In this case, when the invitation messages are received by mobile device 10B, the "inbox" or the like of mobile device 10B will show two messages from mobile device 10A, i.e., the email invitation and the SMS invitation. When the messages arrive, the user of mobile device 10B could be working in any application of mobile device 10B, such as the calendar application, the address book application, the browser application or the phone application, or not currently using mobile device 10B at all (although it is powered on). The user will be notified of the arrival of the invitation messages in the same manner as any other message received by mobile device 10B (e.g., by beeping and/or vibrating). When the user of mobile device 10B opens either of these two messages, the peer-to-peer messaging application will be invoked to process the message. The automatic invocation of the peer-to-peer messaging application may be accomplished by providing each invitation message, regardless of form, with special indicators to indicate that it is an invitation for a peer-to-peer messaging session and by programming the peer-to-peer application to monitor all incoming messages for such indicators. In addition, each invitation message, when created within the peer-to-peer messaging application, will include an indication of the number (over different paths) of invitation messages that were sent. In the case where multiple paths are used, as in this example, the peer-to-peer messaging application will next scan the "inbox" or the like for the other invitation message(s). For example, if the email invitation message is opened first, the peer-to-peer application will scan the "inbox" or the like for the SMS invitation message. As described above, the invitation messages may be identified by the special indicators provided therewith. The peer-to-peer messaging application in this embodiment will not provide the user of mobile device 10B with the ability to accept the invitation until the other invitation message(s) is found. Once the other invitation message(s) is found, the user of mobile device 10 may accept the invitation as described above, reject the invitation, or postpone the decision to accept or reject.

Figure 4:
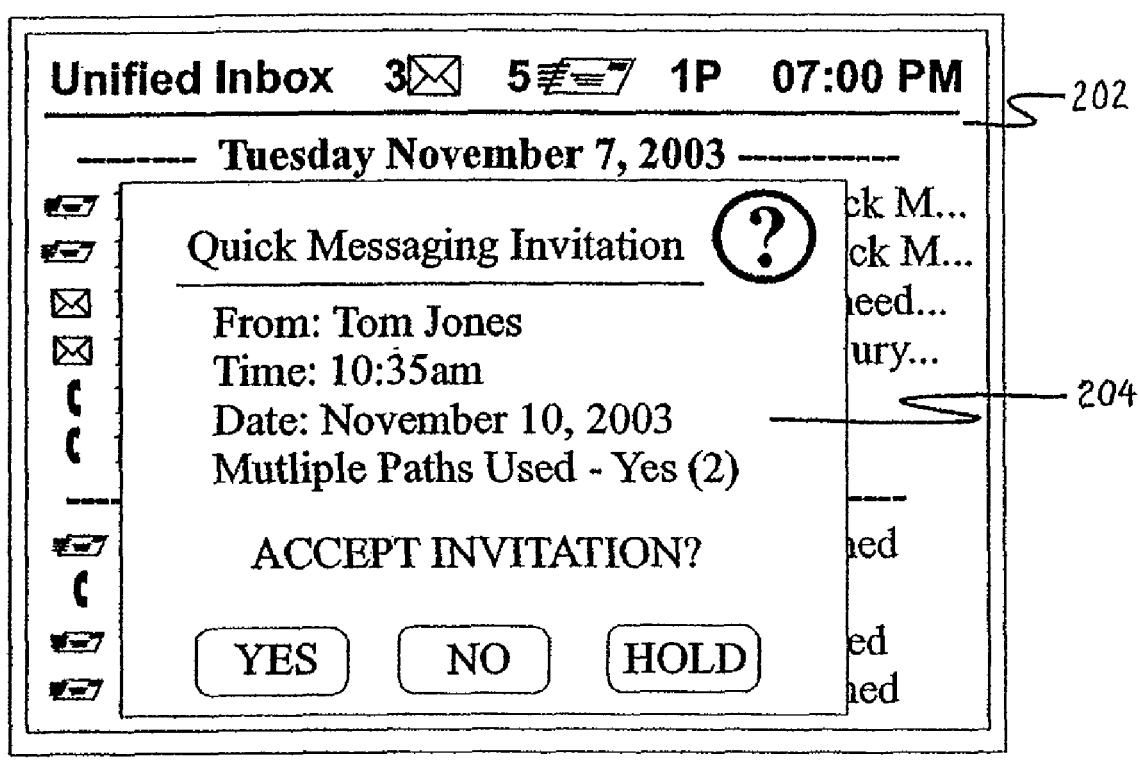
FIG. 4 shows an example embodiment of a graphical user interface for notifying a user of receipt of a messaging invitation.

Reference is now made to FIG. 4, which shows an example embodiment of a graphical user interface 200 for notifying a user of receipt of a messaging invitation. The graphical user interface 200 includes a pop-up dialog box 204 overlaid or cascaded on top of an inbox display screen 202. The pop-up dialog box 204 shown in FIG. 4 indicates the name of the sender, the time, the date, and confirms that multiple paths were used in sending the invitation, which provides some authentication as to the source. The pop-up dialog box 204 also presents the user with three selectable buttons corresponding to the options of accepting the invitation, rejecting the invitation, and delaying a decision on whether to accept or reject the invitation.

Reference is again made to FIGS. 1 and 5. As noted above, in the invitation architecture described in the present application the respective PINs of the mobile devices 10 are covertly exchanged using one of the existing communication applications. A sending mobile device encrypts its PIN prior to transmitting it using the communication application. At the receiving mobile device, the received encrypted PIN is decrypted. Through appropriate key management, access to the unencrypted PIN is limited to the messaging applications on the respective two mobile devices.

There are a number of encryption and key management techniques that may be employed in various embodiments within the scope of the present application. Moreover, the particular transformation or function that may be used in conjunction with a key value to convert the PIN into an encrypted PIN may include a wide range of cryptographic transformations or functions. Those of ordinary skill in the art will appreciate that a wide range of such functions are known and may be selected, having regard to the processing power and any time constraints associated with a particular application or system.

In one embodiment, the messaging application 160 employs symmetric encryption. Symmetric encryption is a cryptographic technique wherein it is computationally easy to determine one key from another key in the key pair. In most symmetric encryption schemes, the keys are identical. Symmetric encryption relies upon the secrecy of the keys. Accordingly, the key pair is usually distributed securely, and not over unsecured channels. In one embodiment, the user of mobile device 10A uses a relatively secure channel, such as a voice channel, to provide the user of mobile device 10B with a key value or a seed value from which the key may be derived. For example, the first user may provide the second user with a codeword or password which the second user enters into the mobile device 10B when prompted. The codeword or password may be used as a seed value in conjunction with an algorithm to compute the secret key for use in encrypting and decrypting communications.

In another embodiment, the messaging application 160 employs public-key encryption. Public-key encryption is a cryptographic technique having an encryption transformation and decryption transformation wherein it is computationally infeasible to determine the decryption transformation from the encryption transformation. In other words, the encryption function is a trap-door one-way function that provides an output cipher text. Even knowing the cipher text and the encryption key, one cannot determine the decryption key and thereby obtain the unencrypted content.

Public-key encryption functions by having each mobile device 10 generate a public-private key pair. Each device shares its public key but protects the secrecy of its private key. Other devices may encrypt messages to a first device using the first device's public key, and only the first device will be able to decipher the messages since only the first device has the corresponding private key.

In the context of the messaging system described herein, the messaging applications 160 include a component for managing key pair generation and key exchanges. The key pair may be generated from a random seed value, such as, for example the time and date or other pseudo-random seeds. The public key for each mobile device 10 is communicated to the other mobile device 10 using one of the communication applications 162. For example, the public key value may be embedded or attached to an e-mail sent from one mobile device 10A to the other mobile device 10B. In some embodiments, the messaging application 160 on the initiating mobile device 10A embeds or attaches its public key $K_a$ to the invitation message sent to the receiving mobile device 10B. The receiving mobile device 10 in turn embeds or attaches its public key $K_b$ to the acceptance message sent to the initiating mobile device 10A. In one embodiment, the communication application 162 employed by the messaging application 160 to implement the invitation and acceptance procedure is an e-mail application. In such an embodiment, the public keys may be attached to the e-mail as binary files. They may alternatively be embedded in the body of the e-mail text. Those of ordinary skill in the art will be familiar with the range of possibilities for attaching or embedding public key data into existing communication application messages.

Figure 6:
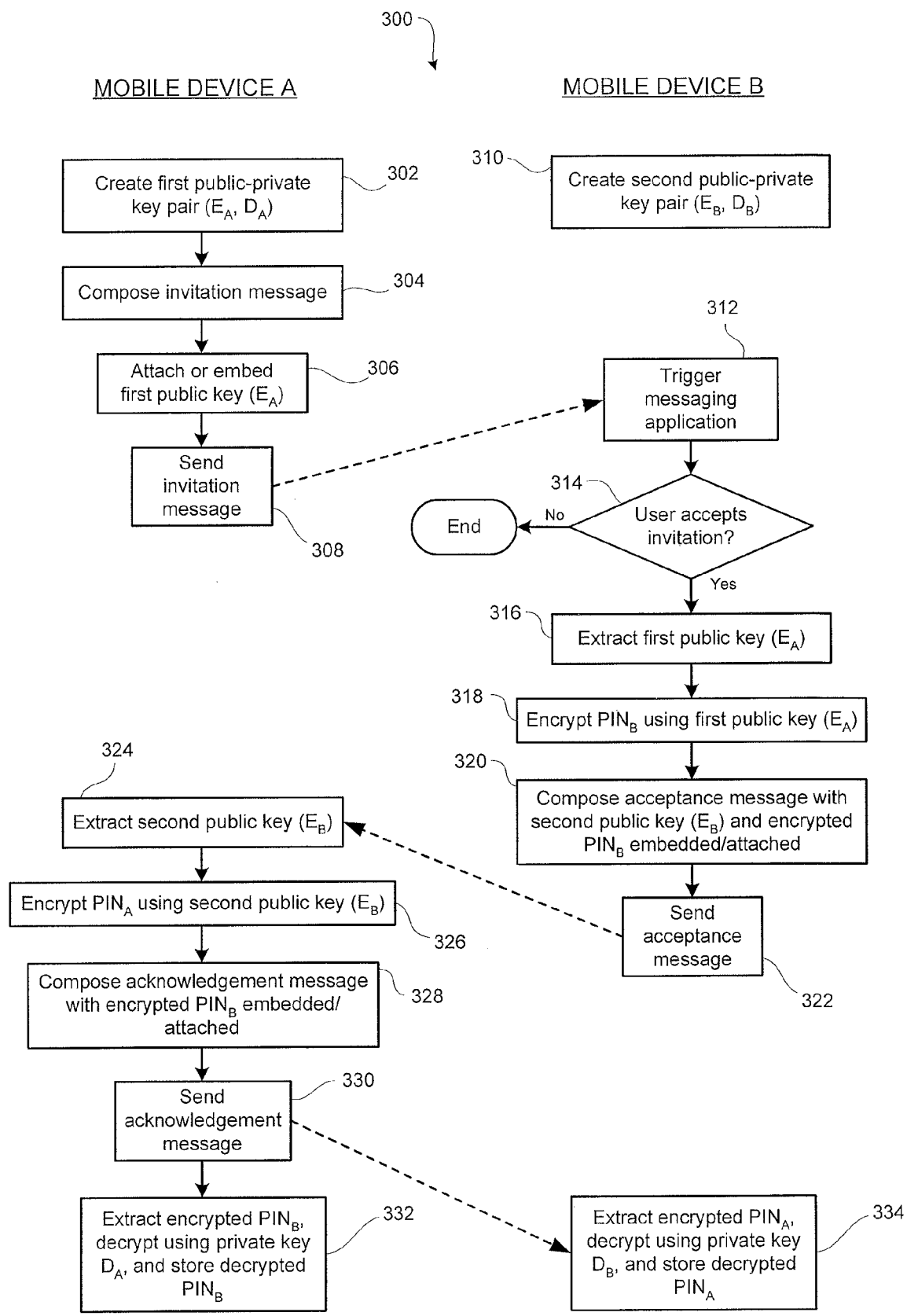
FIG. 6 shows, in flowchart form, a method for securely exchanging personal identification numbers in a mobile messaging system.

Reference is now made to FIG. 6 which shows, in flowchart form, a method 300 for securely exchanging PINs in a mobile messaging system. The method 300 shown in FIG. 6 relates to an embodiment employing a public key encryption scheme.

The method 300 begins in step 302 with the generation of a first public-private key pair, $E_A$, $D_A$, by the messaging application 160 (FIG. 5) of the first device 10A (FIG. 1). The key pair may be generated for each invitation sent by the device 10A or it may be generated only once, or only periodically, by the device 10A and used for more than one invitation messaging process.

In step 310, the second device 10B generates the second public-private key pair, $E_B$, $D_B$. As with step 302, step 310 may be performed anew for each invitation received or may be calculated once (or periodically) and used in more than one invitation messaging process. It will be appreciated that the public-private key pair E, D, generated by a device 10 may be used for both sending invitations as an initiating device or for responding to invitations as a receiving device. In some embodiments, the key pair is generated off-line and is stored on the device 10 at the time of manufacturing or deployment.

The user of device 10A triggers an invitation process by providing an invitation command to the messaging application 160. The invitation command may be selected by the user from a menu. The user may be required to provide address or other contact information for the intended recipient of the invitation. The invitation command invokes the invitation component of the messaging application 160, which composes an invitation message in step 304. The message is composed using one of the communication applications 162, such as an e-mail application. The messaging application 160 ensures that the composed message includes an indicator to alert the messaging application 160 on the receiving mobile device 10B to the fact that the message is an invitation.

In step 306, the messaging application 160 attaches or embeds the first public key $E_A$ into the composed invitation message. In one embodiment, the message is an e-mail message and the first public key $E_A$ is inserted in the text body of the e-mail message so as to enable the message to traverse firewalls and spam filters.

In step 308, the communication application sends the invitation message to the receiving mobile device 10B. This message appears in the "inbox" for the communication application at the receiving mobile device 10B. Either on receipt of the invitation message or once the user opens the invitation message, the monitoring component of the messaging application 160 recognizes it to be an invitation. Accordingly, in step 312, the messaging application 160 is triggered.

The messaging application 160 queries the user in step 314 to determine whether the user wishes to accept or reject the invitation. If the user rejects the invitation, then the method 300 ends. If the user accepts the invitation, then the messaging application 160 extracts the first public key $E_A$ from the invitation message in step 316. In step 318, it then uses the extracted first public key $E_A$ to encrypt the PIN for the second mobile device 10B (i.e. $PIN_B$) in accordance with a predefined encryption transformation or function. The messaging application 160 then composes an acceptance message in step 320 for transmission through one of the communication applications 162, such as an e-mail application. The acceptance message includes the encrypted $PIN_B$ and the second public key $E_B$. The encrypted $PIN_B$ and the second public key $E_B$ may be embedded or attached to the acceptance message. The acceptance message is then sent to the first mobile device 10A in step 322.

The messaging application 160 on the first mobile device 10A recognizes the acceptance message, either on receipt or once the user opens the message, and it extracts the second public key $E_B$ from the acceptance message in step 324. In step 326, the messaging application 160 encrypts the PIN for the initiating mobile device 10A (i.e. $PIN_A$) in accordance with the predefined encryption transformation or function. The messaging application 160 then composes an acknowledgement message in step 328 for transmission through one of the communication applications 162, such as an e-mail application. The acknowledgement message includes the encrypted $PIN_A$, which may be embedded or attached to the acknowledgement message. The acknowledgement message is then sent to the second mobile device 10B in step 330.

Each mobile device 10 decrypts the encrypted PIN it has received using its private key $D_A$, $D_B$, respectively, as shown in steps 332 and 334. The devices 10 then store the decrypted PINs in association with contact information for the user of the other device 10. Accordingly, the user of the other device 10 is now part of a "buddy list" or contact list for use by the messaging application 160. Messages may now be sent directly from one user to the other user using the messaging application to compose messages that incorporate the PIN of the other user for routing.

In yet another embodiment, the messaging applications 160 employ the Diffie-Hellman key agreement protocol to establish a secret key shared between the two mobile devices 10. The protocol requires two parameters p and g, wherein p is a prime number and g is a number less than p, with the property that for every number n between 1 and p−1 inclusive, there is a power k of g such that n=$g^k$ mod p. In the context of the messaging applications 160 in the peer-to-peer messaging system of the present application, a first messaging application generates a private value a and a public value $g^a$ mod p, where a is an integer selected from 1 to p−2. The second messaging application generates its own private value b and its public value $g^b$ mod p, wherein b is an integer from 1 to p−2. The messaging applications exchange public values, as described above in conjunction with FIG. 5, and then calculate a shared session key k from the relation k=$g^{ba}$=$(g^a)^b$ mod p.

In yet another embodiment, the invitation architecture of the present application includes a passcode-based authentication procedure. The invitation sent from a first mobile device to a second mobile device includes a question. The GUI dialog box present the user of the second mobile device includes display of the question and provides the user with an opportunity to select or submit an answer. The answer is transmitted with the acceptance message sent from the second device to the first device. The first device compares the answer contained in the acceptance message with the correct answer stored at the first mobile device to authenticate the identity of the user of the second mobile device. The user of the first mobile device may provide the user of the second mobile device with the correct answer via an alternative communication application, such as through a voice call. The passcode-based authentication procedure provides enhanced security for ensuring that a messaging relationship is established between the correct parties.

Figure 2:
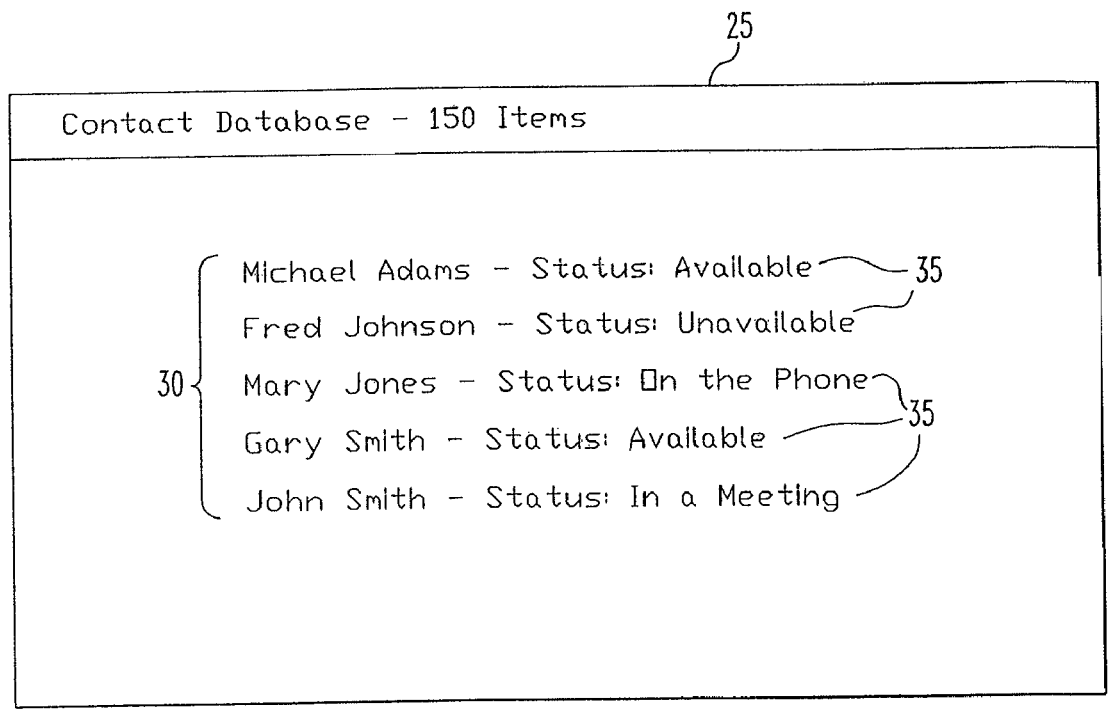
FIG. 2 is a view of a portion of a display of a mobile device showing an exemplary contact database screen which is part of a peer-to-peer messaging application.

Reference is once again made to FIG. 1. According to another aspect of the present application, the peer-to-peer messaging application of each mobile device 10 includes a contact database that stores the name and/or other identifying information and corresponding PIN for each user of another mobile device 10 with whom the user of the mobile device 10 has communicated or may wish to communicate using the peer-to-peer messaging application. This contact database is thus similar to the "buddy lists" that are part of IM applications. User and PIN information may be added to and stored in the contact database each time the user establishes a peer-to-peer messaging session with another user. Entries may also be selectively deleted from the contact database by a user. FIG. 2 is a view of a portion of a display of a mobile device 10 showing an exemplary contact database screen 25 which is part of the peer-to-peer messaging application and displays a listing 30 of contacts stored in the contact database. As seen in FIG. 2, contact database screen 25 also provides status information 35 for each contact listed in listing 30 that relates to the likely availability of the particular contact to participate in a peer-to-peer messaging session, referred to as "implied availability." This availability information is discussed in greater detail below.

According to a further aspect of the present application, each mobile device 10 (referred to as the "first mobile device 10" for clarity) periodically transmits, such as every ten minutes to minimize data traffic, availability information pertaining to it to the mobile devices 10 of each of the users listed in the contact database of the first mobile device 10 (referred to as the "other mobile devices 10" for clarity) through wireless network 15 and routing server 20 using the stored PIN of each of those users. In one particular embodiment, if any of the other mobile devices 10 is off or out of coverage range, routing server 20 will queue a number of availability information messages intended for such other mobile devices 10, and will deliver them once the other mobile devices 10 are turned on or are back in coverage range. The availability information, which will change over time, is derived from the current operational state of the first mobile device 10. The availability information is intended to provide an indication of the user's activity in the first mobile device 10 in order to give each of the users of the other mobile devices 10 in the contact database an estimate of how likely it is that the user of the first mobile device 10 will read and reply to a peer-to-peer message sent to the user of the first mobile device 10. Thus, because all of the mobile devices 10 in system 5 (unless disabled as described below) transmit their availability information to all of their contacts, it will be appreciated that each mobile device 10 in system 5 will have availability information for each of the other users in its contact database. As a result, a user of any mobile device 10 will able to consult the availability information of any of the contacts listed in contact database of the mobile device 10 to get an idea as to whether a particular contact is likely to receive and respond to a peer-to-peer message, which information may effect the decision as to whether to send a peer-to-peer message at all.

The availability information may consist of a general status indicator such as "available," indicating, for example, that the mobile device 10 is powered on and in range of the wireless network 15 and not actively utilizing an application that would prevent a peer-to-peer message from being received, such as being engaged in a phone call using the telephone application, or "unavailable," indicating, for example, that the mobile device 10 is powered off or out of range of the wireless network 15. In addition, the availability information may relate to specific states of or events occurring on the mobile device 10, such as ignoring incoming telephone calls, the user powering the mobile device 10 off, the first mobile device 10 being involved in a current telephone call, the user of the first mobile device 10 being in a meeting as indicated by an entry in the calendar application provided in the mobile device 10, or the user of the mobile device 10 is currently using the peer-to-peer messaging application. As will be appreciated, the availability information may be tied to and derived from every action of and/or piece of information available within the mobile device 10, and that the specific examples listed above are meant to be exemplary only and not limiting. In addition, the general status indicators may comprise a number of levels or degrees of availability based upon information relating to the specific states of and/or events occurring on the mobile device 10. In such a case, availability information may be reported on a scale indicating the various levels or degrees of availability, such as "Available-Level 1," "Available-Level 2," and so on. In addition, if a given user of a mobile device 10 does not want their availability to be tracked this closely, they may selectively prevent their mobile device 10 from transmitting availability information.

FIG. 3 is a view of a portion of a display of a mobile device 10 showing an exemplary status screen 40 forming a part of the peer-to-peer messaging application. Status screen 40 is the main screen of the peer-to-peer messaging application and provides the user of the mobile device 10 with overall status information relating to the peer-to-peer messaging application. In particular, status screen 40 provides information relating to various groups, including a current conversations group 45, a blocked correspondents group 50 and a pending conversations group 55. The current conversations group 45 lists and provides information relating to all of the peer-to-peer messaging sessions, also referred to as conversations, in which the mobile device 10 is currently engaged. A current conversation means either that the mobile device 10 has sent an invitation as described above to another mobile device 10 and has received an acceptance message as described above in return, or that another mobile device 10 has sent the mobile device 10 an invitation as described above and the mobile device 10 has responded with an acceptance message as described above. The blocked correspondents group 50 provides a listing of users of other mobile devices 10 from whom the user of this mobile device 10 no longer wishes to receive peer-to-peer messages; their messages will be blocked and not displayed to the user. Preferably, "unavailable" availability information is transmitted by the mobile device 10 to each of the blocked correspondents. Alternatively, peer-to-peer messages from users of other mobile devices 10 from whom the user of this mobile device 10 no longer wishes to receive peer-to-peer messages may be blocked and not displayed to the user by removing such other users from the contact database; in this case, the peer-to-peer messaging application will be adapted to block messages from any user not listed in the contact database. The pending conversations group 55 provides information relating to all of the currently pending conversations of the mobile device 10. A pending conversation means either that the mobile device 10 has sent an invitation as described above to another mobile device 10 and has not yet received a response, or that another mobile device 10 has sent the mobile device 10 an invitation as described above and the mobile device 10 has not yet responded.

The current conversations group 45, the blocked correspondents group 50 and the pending conversations group 55 may be selectively expanded, where additional information is displayed, or collapsed, where additional information is not displayed. Each of the current conversations group 45, the blocked correspondents group 50 and the pending conversations group 55 is shown in FIG. 3 in expanded from. A user may selectively toggle between the expanded and collapsed states by providing an input into the mobile device 10 through an input apparatus, such as a plurality of keys and/or a rotating thumbwheel, included as part of the mobile device 10. In the expanded state, the current conversations group 45 lists for each current conversation: (1) the user associated with the other mobile device 10, (2) availability information relating to the other mobile device 10, and (3) the date and/or time of the most recent message sent or received. Since a peer-to-peer messaging session can remain open and active for long periods of time, e.g., weeks or months, item (3) provides a quick reference as to which conversations are most active and current. In the expanded state, the pending conversations group 55 lists for each pending conversation: (1) the user associated with the other mobile device 10, and (2) availability information relating to the other mobile device 10. As seen in FIG. 3, an icon 60 indicative of the availability information is preferably provided next to each entry in the current conversations group 45 and the pending conversations group 55 for ease of reference for the user.

Although the foregoing description refers to the possibilities of embedding or attaching PINs, keys, or other data elements to messages sent by one of the communication applications, it will be understood that the term "embed" or "embedding" as used herein is meant to be interpreted broadly to include attaching, embedding, or otherwise transmitting or sending such a data element with a message.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method implemented by a mobile device in a system comprising said mobile device, a wireless network and a routing server coupled to the wireless network, the mobile device having a user interface and a plurality of communications applications and further having a messaging application, the mobile device having a first personal identification number, the method comprising:
   receiving an invitation via one of the communications applications, the invitation including a question;
   displaying the question;
   receiving through the user interface a received answer in response to the question;
   encrypting the first personal identification number;
   transmitting the received answer and the encrypted first personal identification number in response to the received invitation;
   receiving an encrypted second personal identification number in response to the transmitted received answer and first personal identification number;
   generating an encryption key using the received answer; and
   decrypting the encrypted second personal identification number using said encryption key,
   whereby peer-to-peer messages are sent and received by the mobile device using said messaging application, and wherein each transmitted peer-to-peer message contains the second personal identification number, each received peer-to-peer message contains the first personal identification number, and each peer-to-peer message is routed by the routing server based upon said personal identification numbers.

2. The method claimed in claim 1, wherein the step of transmitting the received answer and the encrypted first personal identification number comprises transmitting an acceptance message containing the received answer and the encrypted first personal identification number.

3. The method claimed in claim 1, wherein said one of the communication applications comprises an e-mail application.

4. The method claimed in claim 1, wherein the step of receiving comprises receiving the invitation from a second mobile device, the step of transmitting comprises transmitting the encrypted first personal identification number to the second mobile device, the step of receiving the encrypted second personal identification number comprises receiving the encrypted second personal identification number from the second mobile device.

5. The method claimed in claim 1, wherein the step of displaying the question includes displaying an accept option and a reject option with regard to the invitation, and wherein receiving through the user interface a received answer includes receiving selection of the accept option.

6. A method implemented by a mobile device in a system comprising said mobile device, a wireless network and a routing server coupled to the wireless network, the mobile device having one or more communications applications and further having a messaging application, the mobile device having a first personal identification number, the method comprising:
   sending an invitation via one of the communications applications, the invitation including a question, the question having a stored answer;
   generating an encryption key using the stored answer;
   encrypting the first personal identification number using said encryption key;
   receiving a received answer and an encrypted second personal identification number in response to the invitation;
   confirming that the received answer matches the stored answer;
   decrypting the second encrypted personal identification number; and
   transmitting the encrypted first personal identification number in response to receipt of the encrypted second personal identification number,
   whereby peer-to-peer messages are sent and received by the mobile device using said messaging application, and wherein each transmitted peer-to-peer message contains the second personal identification number, each received peer-to-peer message contains the first personal identification number, and each peer-to-peer message is routed by the routing server based upon said personal identification numbers.

7. A mobile device for use in a peer-to-peer messaging system comprising said mobile device, a wireless network, and a routing server coupled to the wireless network, the mobile device comprising:
   a first memory storing a first personal identification number;
   one or more communication applications;
   a first encryption component configured to encrypt said first personal identification number and decrypt an encrypted second personal identification number;
   a first contact management component configured to receive an invitation via one of said one or more communication applications, the invitation including a question, display the invitation including the question, receive a received answer via a user interface in response to the question, transmit the received answer and the encrypted first personal identification number in response to the invitation, and receive the encrypted second personal identification number in response to transmission of the encrypted received answer and first personal identification number; and
   a first messaging application for sending and receiving peer-to-peer messages, whereby each transmitted peer-to-peer message includes the second personal identification number, each received peer-to-peer message includes the first personal identification number, and wherein said peer-to-peer messages are routed by the routing server based upon said personal identification numbers, wherein said first encryption component generates an encryption key using the received answer and decrypts said second personal identification number using said encryption key.

8. The mobile device claimed in claim 7, wherein the first contact management component is configured to send an acceptance message in response to the invitation, and the acceptance message comprises the received answer and the encrypted second personal identification number.

9. The mobile device claimed in claim 7, wherein the first contact management component is configured to receive an acknowledgement message, and wherein the acknowledgement message comprises the encrypted second personal identification number.

10. The mobile device claimed in claim 7, wherein said one of the communication applications comprises an e-mail application.

11. A peer-to-peer messaging system, comprising two mobile devices including a first mobile device and a second mobile device, the second mobile device comprising:

a second memory storing a second personal identification number and a stored answer, one or more communication applications, a second encryption component configured to generate an encryption key using said stored answer, encrypt said second personal identification number using said encryption key and decrypt an encrypted first personal identification number, a second contact management component configured to send an invitation to the first mobile device using said one of said communication applications, receive an acceptance from said first mobile device containing a received answer, receive the encrypted first personal identification number from the first mobile device, confirm that the received answer matches said stored answer, and transmit the encrypted second personal identification number to the first mobile device, a second messaging application for sending and receiving peer-to-peer messages.

* * * * *